June 21, 1949.  D. I. BOHN  2,474,029
TRIPPING DEVICE

Filed Oct. 11, 1944  3 Sheets-Sheet 1

INVENTOR.
DONALD I. BOHN.
BY
Samuel Ostrolenk
ATTORNEY.

June 21, 1949.  D. I. BOHN  2,474,029
TRIPPING DEVICE
Filed Oct. 11, 1944  3 Sheets-Sheet 3

INVENTOR.
DONALD I. BOHN
BY
*Samuel Ostrolenk*
ATTORNEY

Patented June 21, 1949

2,474,029

UNITED STATES PATENT OFFICE 2,474,029

TRIPPING DEVICE

Donald I. Bohn, Pittsburgh, Pa., assignor to I. T. E. Circuit Breaker Company, Philadelphia, Pa., a corporation of Pennsylvania Application October 11, 1944, Serial No. 558,268

5 Claims. (Cl. 175—294)

1

This invention relates to circuit breakers and more particularly relates to circuit breakers responsive both to rising reverse currents and excessive forward currents.

In many circuits, protection from a reverse current requires that the circuit breaker be more quickly responsive to such reverse currents than to rising forward currents. This is particularly true in rectifier circuits where the cathode breaker is subject to reverse current conditions due to a fault in the rectifier. The resulting short circuit condition from such a fault in the rectifier produces a high rate of rise of reverse short circuit current and may result in considerable damage if permitted to persist. Where the holding magnet type of circuit breaker is employed as shown in application Serial No. 524,540, the reverse current may build up before the overload magnet has an opportunity to trip the circuit breaker and thus lock the breaker in against a fault.

In accordance with my invention, I provide a circuit breaker which, while being quickly responsive to a direct or forward rise to overload or short circuit values, is more quickly responsive to the rate of rise of a reverse current.

In general, my invention contemplates a tripping magnet provided with two electromagnetic paths; one, the usual magnetic circuit including the armature and air gap to the pole face, and another magnetic path around the air gap portion of the first magnetic circuit.

The latter or second magnetic path provides a by-pass for some of the magnetic flux around the armature air gap during rising forward current values. When this by-pass becomes saturated (which occurs at predetermined short circuit current values) the magnetic flux across the armature air gap will be such as to effect an operation of the armature to effect a tripping of the circuit breaker.

When a reverse current results, the by-pass magnetic path around the armature becomes ineffective as a by-pass and all of the flux in the main magnetic path flows through the armature to effect a quicker tripping of the armature; the blocking of the by-pass being a direct function of the rate of rise of such reverse current.

Accordingly, an object of my invention is to provide a novel circuit breaker which is responsive to forward current values and is responsive to the rate of rise of reverse current value.

A further object of my invention is to provide a novel electro-magnet operable in response to predetermined currents in one direction and operable in response to the rate of rise in current in the opposite direction.

Still another object of my invention is to provide a novel electro-magnet having a by-pass magnetic path around the armature.

Still a further object of my invention is to provide a novel cathode circuit breaker for a rectifier system.

There are other objects of my invention which together with the foregoing will appear in the detailed description which is to follow in connection with the drawings, in which Figure 1 is a schematic illustration of my novel electro-magnet structure.

Figure 1:
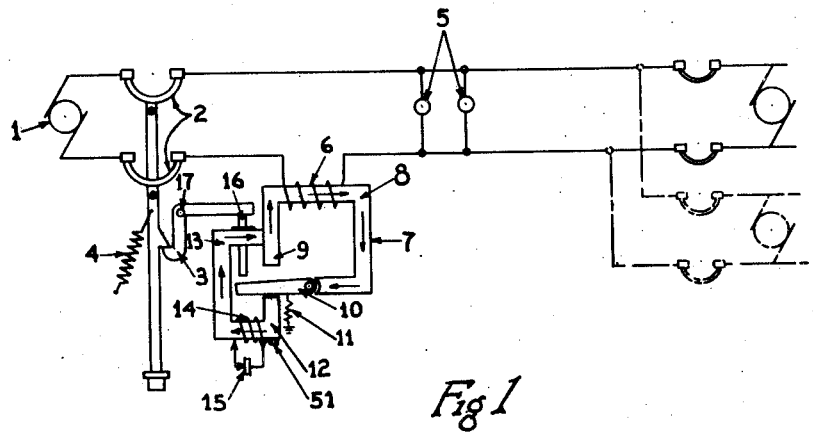

Referring now to Figure 1, I have shown schematically a source of power 1, and a circuit fed therefrom which is protected by a circuit breaker schematically shown at 2. The circuit breaker 2 is provided with the usual latch mechanism 3. Latch 3 holds the circuit breaker in closed position against the action of the tension spring 4 which, on release of the latch, operates the circuit breaker to open position.

A load 5 is illustrated schematically as fed with energy supplied by generator 1. Connected in series in the load circuit 5 is the winding 6 of an electro-magnet 7 for controlling the circuit breaker 2.

The electro-magnet 7 which embodies my novel construction comprises a first usual magnetic path 8 which may be traced from one pole face 9 to the electro-magnetic path about which the winding 6 is mounted to the armature 10.

The armature 10 is normally biased to its lowermost position by a spring 11 toward the by-pass electro-magnetic path 12 which by-passes the gap between the armature 10 and the pole face 9 over the magnetic circuit completed along path 13.

A winding 14 is mounted on the core of this magnetic circuit 12 and is connected to the opposite terminals of a rectifier 15 which may be of any suitable construction for permitting current to flow only in one direction for the current values here involved.

When normal currents flow in the main circuit, the flux generated by the current flowing in the series winding 6 will extend over the electro-magnetic path 8 and over armature 10 and around the by-pass magnetic path 12 and 13. By a suitable construction of the magnetic by-pass 12 and by a control of its cross-sectional area, the flux in the by-pass will become saturated at a predetermined current value flowing through the winding 6.

For purposes of illustration it will be assumed that this flux has a clockwise direction as shown by the arrows. As a result of increases in the current flow through winding 6 causing corresponding increases in the flux, the flux will take the path of least reluctance at armature 10 which on saturation of the by-pass, is across the gap to the pole face 9. Accordingly when the current has reached a predetermined excess value, the armature 10 will be attracted to the pole face 9 against the action of the spring 11.

The armature 10 as it moves towards its pole piece 9 operates a tripper bar 16, which in turn will rock the latch mechanism 3 from its normal position about its pivot 17 for disengaging the circuit breaker arm to permit the circuit breaker to operate to its open position under the action of spring 4, in the usual manner now well known in the art, and here merely shown schematically.

In the operations thus far described, the clockwise direction flux rising in value in the magnetic path 12, as a result of rising forward currents, will induce a voltage which would cause a current flow in the windings 14 which would be in such a direction (assumed for illustration to be as shown by the arrow) that the rectifier 15 prevents any current flow, and accordingly an open circuit condition exists and no current flows in the winding 14. As aready explained, flux produced by forward rising current takes the lower reluctance path around the armature air gap until predetermined overload values are reached. When such currents flow in winding 6, the resulting flux in the main magnetic circuit 7 is such that the by-pass is saturated and the flux therefore jumps the air gap and operates armature 10.

It will now be assumed that because of a particular short circuit condition, current in the main circuit is flowing through the series winding 6 in the reverse direction from that shown by the arrow. The flux in the magnetic path 8, as a result of this reverse current flowing in the winding 6, will have a counterclockwise direction or reverse to that previously assumed with current flowing in the normal direction. The flux in the by-pass 12 will therefore have a counterclockwise direction or reverse to that previously assumed. Accordingly, the voltage induced and resulting current generated by this flux in the winding 14 for rising reverse current will be in the reverse direction from that shown by the arrow and that previously obtained. The rectifier 15 permits this reverse current to flow.

The current value in the winding 14, for this reverse direction of flux, will of course be a function of the rate of rise of the flux in the magnetic path 12, which in turn is a function, of the rate of rise, of the reverse current through the winding 6.

The flux set up in the magnetic path 12, by this current flowing through the winding 14, will be clockwise and buck the counterclockwise flux set up by current through 6, thus making the by-pass a high reluctance path. The flux in the main magnetic path 8, induced by the current in winding 6, will thereore take the path across the armature 10 and pole piece 9. The armature therefore will be attracted to its poe piece 9 at a lower current value of the reverse current, than in the case of current rise in the forward direction, and will therefore effect a more rapid tripping of the circuit breaker at a relatively low reverse current.

A further condition that must be considered is a falling forward current, from a current value just below the tripping value. The flux induced in the by-pass by the forward current has already been described as having a counterclockwise direction which on upward change sets up currents in the direction shown by the arrow which cannot pass the rectifier. The flux set up in the by-pass around the armature by the decreasing forward current will induce currents in coil 14 having the reverse direction from that shown by the arrow or the same direction as a rising reverse current. This induced current flowing in winding 14 is short-circuited by the rectifier and will generate a clockwise flux in the by-pass as aready described in connection with the rising reverse current case. This flux being in the same dfirection as the flux induced by the falling forward current in the main magnetic circuit will therefore tend to maintain the flux set up by the falling forward current. Accordingly a falling forward current will not effect a tripping operation.

Figure 2:
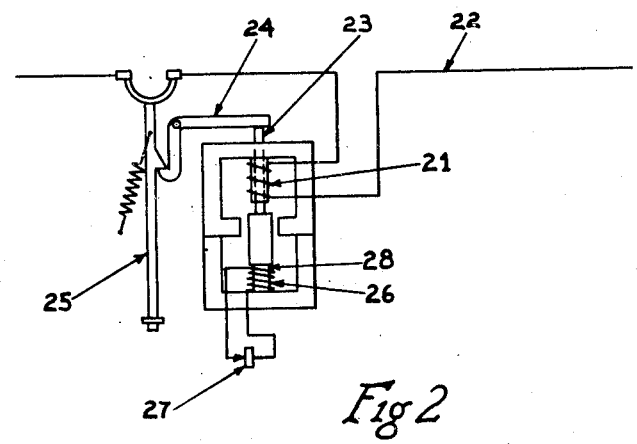
Figure 2 illustrates a modified schematic form of my novel electro-magnet.

In Figure 2 I have shown a modified form of my invention in which the series coil 21 connected in the circuit 22 is mounted on one leg of a magnetic path in which there is a solenoid trip member 23. Member 23 operates on the latch mechanism 24 of the circluit breaker 25 in the usual manner. A second winding 26 on a by-pass core 28 of the magnetic path is connected across a rectifier 27. With current flowing in a forward direction over the circuit 22, the fluxes induced in the magnetic path are such that the current generated by the flux over the by-pass core 28 is blocked by the rectifier 27, and therefore the coil is open-circuited; therefore some of the flux generated by the main winding 21 will flow over the by-pass until the by-pass is saturated. However, when a reverse current condition exists as described above, the current induced in coil 26 is short-circuited by the rectifier 27 due to the fact that the current flowing in this coil is now in the opposite direction. The plunger 23 will therefore operate at lower current values to effect the tripping of the breaker as in the case of Figure 1.

The operation of the device shown in Figure 2 may be further explained by assuming that the coil 21 when energized in a normal direction causes the flux to flow upward in the central core 28. At the top it divides and flows outward in the two top sections and downward in the outside legs. At the mid-point, the flux divides, according to the reluctance of the magnetic circuits, some going inwardly to the center core and upward through the coil 21 to complete the circuit, the remainder going downward in the bottom of the outside legs and then inwardly to the center core 28 in the coil 26 and upward through the center core to complete the circuit.

That flux which passes through the core 28 tends to hold the tripping armature 23 down. The flux that passes to the center core 28 at the mid-point above the core 28 has no downward pull on the tripping armature 23. As the core 28 approaches saturation more and more of the flux crosses the central core at the mid-point above the core 28 and tripping occurs at a high rate of current change in the forward direction, since the rectifier 27 does not pass current and is effectively open-circuited.

With an increase in current in the reverse direction, current is circulated in coil 26 and rectifier 27 which chokes out the flux in core 28 causing all the flux to circulate around the upper half of the magnet 29 and all of the flux is available to trip the circuit breaker.

Figure 3:
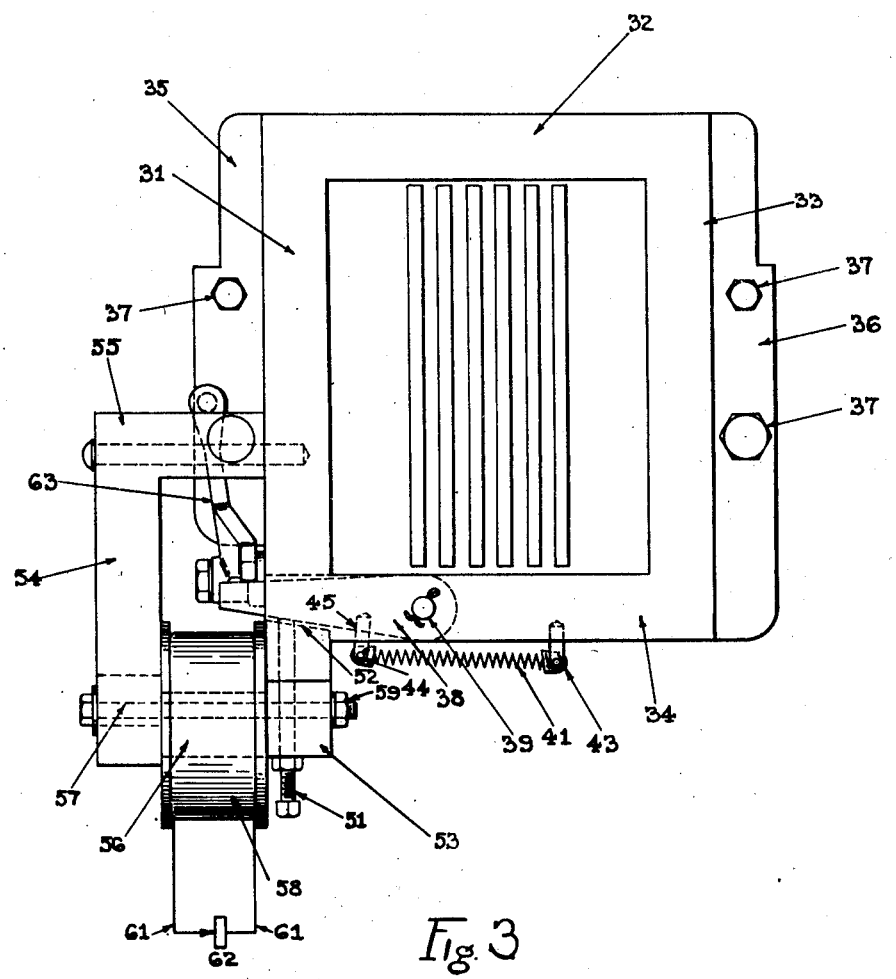
Figure 3 is a detailed view of one form of my novel electro-magnet.

In Figure 3 I have illustrated one practical embodiment of my novel electro-magnet having a winding 40 and adapted to be mounted on the frame of a circuit breaker such as disclosed in the application of Otto Jensen, filed January 15, 1941, Serial No. 374,414, assigned to the present assignee, now Patent No. 2,355,075, issued August 8, 1944.

In this figure a main magnetic circuit or metallic path of relatively high permeability is generally rectangular in shape and has a rectangular cross-section, and comprises the sides 31, 32, 33 and 34 secured to the frame of the circuit breaker in any suitable manner as by way of flanges 35 and 36 and the bolts 37. Included in this magnetic path is an armature 38 pivotally mounted on the pin 39, and biased to its lowermost position by the spring 41, one end of which is secured to the main structure at 43 and the other end to the pin 45 extending from armature 38. Armature 38 extends through a suitable opening between 38' and 52 provided between laminations 31 and 53 and is normally held against back stop 52 by spring 41. Back stop 52 is made adjustable by the set screw 51.

A by-pass magnetic path for the main magnetic path around the armature air gap comprises legs 53, 54 and 55. A core 56 through which the bolts 57 extend carries a coil 58, the core 56 and the bolt 57 being secured between the sections 53 and 54 by nuts 59. The winding or bucking bar 58 is connected over the leads 61 to a rectifier 62. It will be understood that the bucking bar is mounted on a main magnetic circuit as previously schematically described, and that the magnetic paths all are of a laminated construction in the usual manner well known in the art. Armature 38, when operated against the upper pole face acts against the tripper member 63 in the manner well known in the art for tripping a circuit breaker as schematically illustrated in Figure 1.

Figure 4:
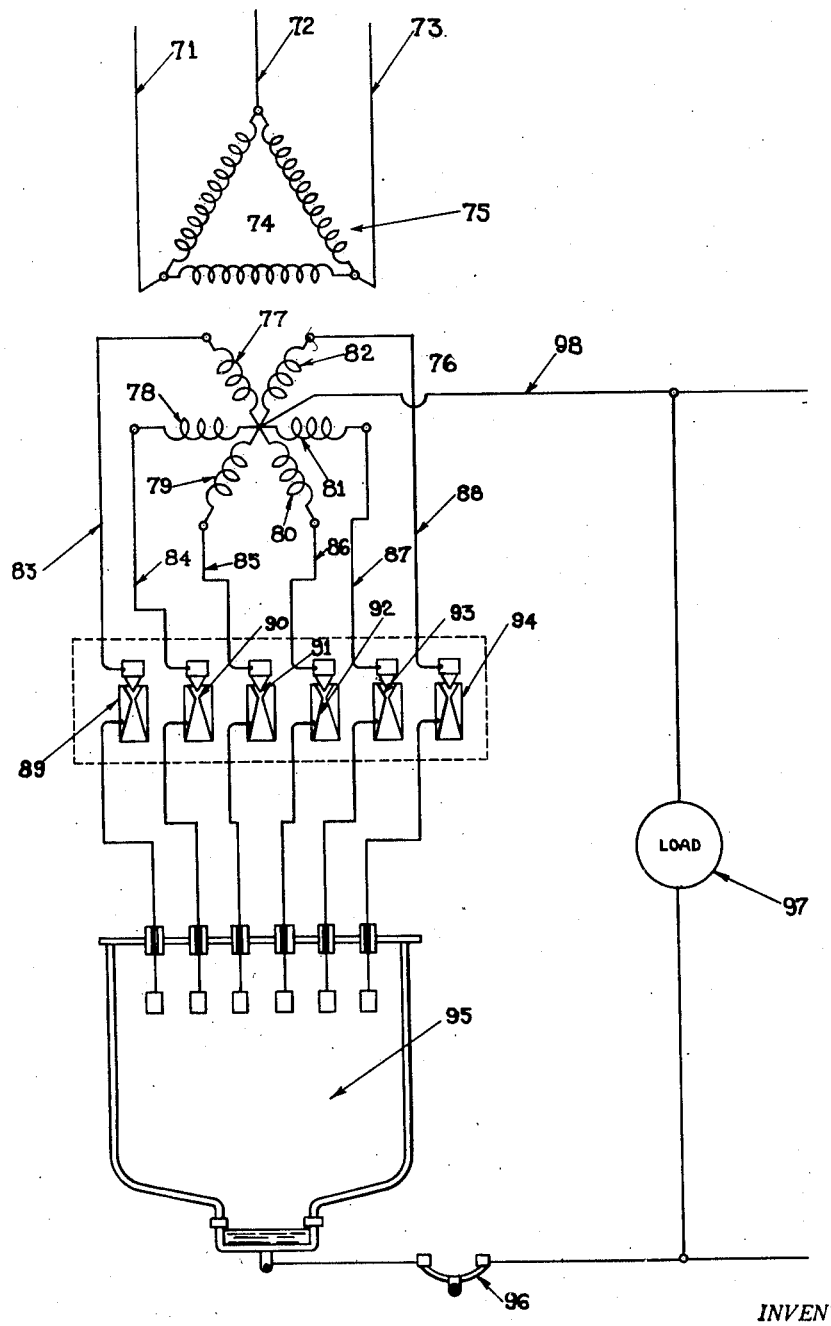
Figure 4 illustrates one form of rectifier system in which my novel breaker may be applied.

In Figure 4 I have schematically illustrated a circuit diagram in which my invention may be employed. In this circuit diagram, a source of power which may be a three-phase source of alternating current is fed over the conductors 71, 72 and 73 to the delta conductive primary 74 of the transformer 75. Secondary 76 of this transformer is star-connected and comprises the windings 77 to 82 connected respectively over the conductors 83 to 88 to the anode circuit breakers 89. The anode circuit breakers are in turn connected over their respective leads to the anodes of a rectifier 95. The cathode of this rectifier 95 is connected over the circuit breaker 96 to the load 97 which may be an electrolytic pot in an aluminum manufacturing system. The other terminal of this load extends over the conductor 98 to the common terminal of the star-connected secondary of the transformer 76.

In practice it has been found that when a short circuit occurs within the rectifier 95, as for example between any pair of anodes, that this short circuit also results in a reverse current flow over the circuit breaker 96. In such cases, it is of great importance that immediately upon the reversal of current that the circuit breaker be quick tripping.

In accordance with my invention the cathode breaker 96 is provided with a magnetic structure as shown in Figure 1 or 2 will effect a tripping of the breaker 96 immediately upon the reversal of current.

As already stated, my novel control may be applied to a circuit breaker such as shown in the Jensen application Serial No. 374,414, but it will be obvious that it may be employed for controlling any circuit breaker.

Although in describing my novel electro-magnet and the associated circuit breaker, I have shown one form of electro-magnet construction, it will be understood that the circuit breaker may take other forms, and that the electro-magnet may take other forms so long as it is so polarized as to provide a by-pass around the gap of the armature which is effective if a current flows in one direction and is an ineffective by-pass for current flowing in the opposite direction.

Although I have illustrated my invention in connection with a particular system for the production of aluminum, and in a rectifier circuit, it will be understood that it is also applicable to other systems, and also to other forms of circuit breakers than is here shown by way of illustration, and I intend to be limited only by the claims herewith.

I claim:

1. An electromagnet for controlling the operation of a circuit breaker, said electromagnet having an armature having an energized and de-energized position, a pole face adjacent to and forming an air gap with said armature, a first magnetic path including said armature air gap and pole face, a second closed iron magentic path including said armature and by-passing the air gap between said armature and pole face of said magnetic path when said armature is in its de-energized position, a first winding connected in series in the circuit to be protected by the circuit breaker, said winding being on the core of said first magnetic path, a second winding on the core of said by-pass magnetic path, and circuit connections for said second winding such that for currents of a predetermined amplitude in a predetermined direction in said first winding, said by-pass has a predetermined reluctance at a predetermined value of said current so that the flux induced by said current finds a path of lower reluctance across said air gap and for currents of a lower than said predetermined amplitude in a direction opposite to said predetermined direction in said first winding, said by-pass has said predetermined reluctance at said different than said predetermined value of said current so that flux induced by said current finds a path of lower reluctance across said air gap at said different than said predetermined current value.

2. An electromagnet for controlling the operation of a circuit breaker, said electromagnet having an armature having an energized and de-energized position, a pole face adjacent to and forming an air gap with said armature, a first magnetic path including said armature air gap and pole face, a second closed iron mgnetic path by-passing the air gap extending from said armature to said pole face of said magnetic path and including said armature when said armature is in its de-energized position, a first winding connected in series in the circuit to be protected by the circuit breaker, said winding being on the core of said first magnetic path, a second winding on the core of said by-pass magnetic path, and circuit connections for said second winding such that for currents of a predetermined amplitude in a predetermined direction in said first winding, said by-pass has a predetermined reluctance at a predetermined value of said current so that the flux induced by said current finds a path of lower reluctance across said air gap and for currents of a lower than said predetermined amplitude in a direction opposite to said predetermined direction in said first winding, said by-pass becomes saturated at said different than said predetermined value of said current so that flux induced by said current finds a path of lower reluctance across said air gap at said different than said predetermined current value.

3. An electromagnet for controlling the operation of a circuit breaker, said electromagnet having an armature movable to an energized position and a de-energized position, a pole face adjacent to and forming an air gap with said armature, a first magnetic path including said armature air gap and pole face, said magnetic path forming a closing metallic path including said pole face and armature when said armature is in its energized position, a second magnetic path including said armature and by-passing the air gap between said armature and pole face and forming a closed metallic magnetic path with a part of said first mentioned magnetic path when said armature is in its de-energized position, a first winding connected in series in the circuit to be protected by the circuit breaker, said winding being on the core of said first magnetic path, a second winding on the core of said by-pass magnetic path, a rectifier connected across said second winding, the direction of the turns of said second winding and the connection of the rectifier being such that when rising current of a predetermined amplitude flows in a predetermined direction in the first winding in the protected circuit inducing a flux having a corresponding direction, the voltage induced in said second winding thereby generates current in a direction blocked by said rectifier, said second magnetic path having a cross-section which at a predetermined current value in said first winding has a predetermined reluctance greater than the reluctance across said air gap so that the flux finds a path of less reluctance across said air gap than around said by-pass at a said predetermined current value, the flux induced by rising current of a lower than said predetermined amplitude in said first winding in the reverse from said above predetermined direction inducing a voltage in said second winding which generates a current therein in a direction which is passed by said rectifier to in turn induce a flux which produces said predetermined reluctance in said by-pass at said different predetermined current value in said first winding than in the first above condition to cause the flux to find a lower reluctance path across said armature air gap at said lower rising current value of said reverse direction current than in the case of said first predetermined current direction.

4. An electromagnet for controlling the operation of a circuit breaker, said electromagnet having an armature having an energized and de-energized position, a pole face adjacent to and forming an air gap with said armature, a first magnetic path including said armature air gap and pole face, a second closed iron magnetic path by-passing the air gap between said armature and pole face of said magnetic path and including said armature when said armature is in its de-energized position, a first winding connected in series in the circuit to be protected by the circuit breaker, said winding being on the core of said first magnetic path, a second winding connected on the core of said by-pass magnetic path, and a rectifier connected across said second winding, the reluctance of said by-pass in relation to the air gap being such that at a predetermined flux intensity caused by current in a predetermined amplitude in a predetermined direction in said first winding, the by-pass provides a path of lower reluctance for said flux exists across said air gap, current in said second winding inducing a flux to provide said lower reluctance across said air gap at a different value of current in the opposite from said predetermined direction in said first winding.

5. An electromagnet for controlling the operation of a circuit breaker, said electromagnet having an armature having an energized and de-energized position, a pole face adjacent to and forming an air gap with said armature, a first magnetic path including said armature air gap and pole face, a second closed iron magnetic path by-passing the air gap between said armature and pole face of said magnetic path and including said armature when said armature is in its de-energized position, a winding connected in series in the circuit to be protected by the circuit breaker, said winding being on the core of said first magnetic path, a second winding connected on the core of said by-pass magnetic path, and a rectifier connected across said second winding.

DONALD I. BOHN.

REFERENCES CITED

The following references are of record in the file of this patent:

UNITED STATES PATENTS

| Number | Name | Date |
|---|---|---|
| 751,442 | Andrews | Feb. 9, 1904 |
| 1,427,368 | Fortescue et al. | Aug. 29, 1922 |
| 1,545,754 | Golladay | July 14, 1925 |
| 1,742,367 | Nettleton | Jan. 7, 1930 |
| 1,760,542 | Cohn | May 27, 1930 |
| 1,761,006 | Butcher | June 3, 1930 |
| 1,813,535 | Gaudenzi | July 7, 1931 |
| 1,920,745 | Grunholz | Aug. 1, 1933 |
| 1,979,127 | Warrick | Oct. 30, 1934 |
| 1,994,921 | Rose | Mar. 19, 1935 |
| 2,001,897 | West et al. | May 21, 1935 |
| 2,046,748 | Hudson | July 7, 1936 |
| 2,435,001 | Field | Jan. 27, 1948 |

FOREIGN PATENTS

| Number | Country | Date |
|---|---|---|
| 123,220 | Switzerland | Nov. 8, 1927 |
| 278,650 | Great Britain | Dec. 15, 1937 |
| 475,640 | Great Britain | Nov. 23, 1937 |